(12) United States Patent
Kaneichi et al.

(10) Patent No.: US 11,176,577 B2
(45) Date of Patent: Nov. 16, 2021

(54) INFORMATION PROVIDING SYSTEM AND SERVER

(71) Applicant: TOYOTA JIDOSHA KABUSHIKI KAISHA, Toyota (JP)

(72) Inventors: Daiki Kaneichi, Nisshin (JP); Hirotaka Karube, Toyota (JP); Atsushi Mizutani, Toyota (JP); Jun Kondo, Nisshin (JP); Kenichi Komuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 16/169,626

(22) Filed: Oct. 24, 2018

(65) Prior Publication Data

US 2019/0130449 A1 May 2, 2019

(30) Foreign Application Priority Data

Oct. 27, 2017 (JP) .............................. JP2017-208320

(51) Int. Cl.
  *G06Q 30/02* (2012.01)
  *G06Q 30/06* (2012.01)
  *B60L 53/60* (2019.01)

(52) U.S. Cl.
  CPC .......... *G06Q 30/0265* (2013.01); *B60L 53/60* (2019.02); *G06Q 30/0603* (2013.01); *B60L 2230/16* (2013.01)

(58) Field of Classification Search
  CPC . B60L 53/60; B60L 2230/16; G06Q 30/0265; G06Q 30/0603
  (Continued)

(56) References Cited

U.S. PATENT DOCUMENTS

2011/0196711 A1* 8/2011 Craig ...................... H04L 67/18
                                                        705/5
2012/0047036 A1* 2/2012 Allan ...................... B60L 53/14
                                                        705/21
(Continued)

FOREIGN PATENT DOCUMENTS

JP      2004220152 A  *  8/2004
JP      2004220152 A     8/2004
(Continued)

OTHER PUBLICATIONS

Advertisement Delivery and Display in Vehicular Networks (Year: 2015).*

(Continued)

*Primary Examiner* — Gautam Ubale
(74) *Attorney, Agent, or Firm* — Hunton Andrews Kurth LLP (57) ABSTRACT

An information providing system includes: a power supply facility installed at a parking area of a shop; and a vehicle connectable to the power supply facility via a power cable. When the vehicle is connected to the power supply facility via the power cable, the power supply facility is configured to transmit information to the vehicle via the power cable. The information includes: a merchandise item list of merchandise items that can be offered by the shop to a user of the vehicle; and content information (movie, video, still image, music, speech, newspaper, magazine, electronic book, game, comics, and the like) that can be utilized by the user of the vehicle in the passenger compartment of the vehicle.

3 Claims, 4 Drawing Sheets (58) Field of Classification Search
USPC .......................................................... 705/319
See application file for complete search history.

(56) References Cited

U.S. PATENT DOCUMENTS

| | | | | |
|---|---|---|---|---|
| 2013/0300362 A1* | 11/2013 | Turner | ................... | G06Q 50/06 320/109 |
| 2014/0188318 A1* | 7/2014 | Langgood | ............... | B60L 53/18 701/22 |
| 2014/0358649 A1* | 12/2014 | Son | ................... | G06Q 30/0241 705/14.4 |
| 2016/0042401 A1* | 2/2016 | Menendez | ......... | G06Q 30/0271 705/14.43 |
| 2016/0063604 A1* | 3/2016 | Shaffer | ............. | G06Q 30/0267 705/14.57 |
| 2017/0323356 A1* | 11/2017 | Gharabegian | ....... | G06F 3/04883 |
| 2018/0047057 A1* | 2/2018 | Mayfield | ............ | G06Q 30/0266 |
| 2018/0370379 A1* | 12/2018 | Chen | ..................... | B60L 53/665 |
| 2019/0130449 A1* | 5/2019 | Kaneichi | ............ | G06Q 30/0265 |

FOREIGN PATENT DOCUMENTS

| | | | | |
|---|---|---|---|---|
| JP | 2009-033265 A | | 2/2009 | |
| JP | 2010134733 A | * | 6/2010 | |
| JP | 2010134733 A | | 6/2010 | |
| JP | 2011175399 A | * | 9/2011 | |
| JP | 2012123819 A | * | 6/2012 | ............. G08G 1/005 |
| JP | 2012220993 A | | 11/2012 | |
| JP | 2013519161 A | | 5/2013 | |
| JP | 2011-82954 A | * | 9/2014 | |
| WO | 2011097126 A1 | | 8/2011 | |

OTHER PUBLICATIONS

Smart Network Mechanism to Advertise Availability of Electric Vehicle Charging Stations (Year: 2012).*

* cited by examiner

INFORMATION PROVIDING SYSTEM AND SERVER

This nonprovisional application is based on Japanese Patent Application No. 2017-208320 filed on Oct. 27, 2017, with the Japan Patent Office, the entire contents of which are hereby incorporated by reference.

BACKGROUND

Field

The present disclosure relates to an information providing system for providing information to an electrically powered vehicle, as well as a server.

Description of the Background Art

Japanese Patent Laying-Open No. 2009-33265 discloses an electrically powered vehicle configured to receive power via a power cable from a power supply device external to the vehicle. When this electrically powered vehicle is connected to another electrically powered vehicle via the power cable, the electrically powered vehicle is configured to perform wired communication with the other vehicle using the power cable.

SUMMARY

As electrically powered vehicles will become pervasive in future, it is expected that many power supply devices for supplying power to such electrically powered vehicles will be provided at parking areas of general shops and the like. In this case, needs of effectively utilizing wired communication with an electrically powered vehicle using a power cable in such shops are expected to be more increased.

The present disclosure has been made to solve the above-described problem and has an object to allow a shop having a parking area provided with a power supply facility to effectively utilize wired communication with an electrically powered vehicle using a power cable.

(1) An information providing system according to the present disclosure includes: a power supply facility installed at a parking area of a shop; and a vehicle connectable to the power supply facility via a power cable. When the vehicle is connected to the power supply facility via the power cable, the power supply facility is configured to transmit information to the vehicle via the power cable. The information includes: merchandise item information of one or more merchandise items that are able to be offered by the shop to a user of the vehicle; and content information that is able to be utilized by the user of the vehicle in a passenger compartment of the vehicle.

According to the above-described system, through the wired communication using the power cable, the information is transmitted to the vehicle from the power supply facility installed at the parking area of the shop. The information includes: the merchandise item information of the one or more merchandise items that can be offered by the shop to the user of the vehicle; and the content information (movie, video, still image, music, speech, newspaper, magazine, electronic book, game, comics, and the like) that can be utilized by the user of the vehicle in the passenger compartment of the vehicle. Accordingly, while charging the vehicle using the power supply facility, the user of the vehicle can check the merchandise item information of the shop in the passenger compartment or can utilize the content information in the passenger compartment. The shop can recommend the user to utilize the content information in the passenger compartment before and after purchasing a merchandise item of the shop. Thus, the shop can use the passenger compartment of the vehicle as a shop space.

(2) In a certain embodiment, the information providing system further includes a server configured to communicate with the power supply facility and store the information. When the vehicle is connected to the power supply facility via the power cable, the power supply facility is configured to transmit, to the vehicle via the power cable, the information received from the server.

According to the above-described embodiment, the power supply facility transmits, to the vehicle, the information received from the server. Therefore, respective pieces of information to be transmitted to the vehicle can be collectively stored and managed in the shop server, rather than power supply facilities. Accordingly, even when the shop owns a plurality of power supply facilities, the information to be transmitted to the vehicle can be stored and managed readily.

(3) In a certain embodiment, the vehicle is configured to transmit, to the server, information of a merchandise item selected by the user of the vehicle from the merchandise items included in the merchandise item information received from the power supply facility. When the server receives, from the vehicle, the information of the merchandise item selected by the user of the vehicle, the server is configured to accept an order of the merchandise item to the shop.

According to the above-described embodiment, while charging the vehicle using the power supply facility, the user of the vehicle not only can check the merchandise item information of the shop in the passenger compartment but also can order a merchandise item in the passenger compartment.

(4) A server according to the present disclosure is configured to communicate with a power supply facility installed at a parking area of a shop. The server includes: a storage configured to store information; and a controller configured to perform, when a vehicle is connected to the power supply facility via a power cable, a process for transmitting information stored in the storage from the power supply facility to the vehicle via the power cable. The information includes: merchandise item information of one or more merchandise items that are able to be offered by the shop to a user of the vehicle; and content information that is able to be utilized by the user of the vehicle in a passenger compartment of the vehicle.

Through the wired communication using the power cable, the server transmits the information to the vehicle from the power supply facility installed at the parking area of the shop. The information includes: the merchandise item information of the one or more merchandise items that can be offered by the shop to the user of the vehicle; and the content information (movie, video, still image, music, speech, newspaper, magazine, electronic book, game, comics, and the like) that can be utilized by the user of the vehicle in the passenger compartment of the vehicle. Accordingly, while charging the vehicle using the power supply facility, the user of the vehicle can check the merchandise item information of the shop in the passenger compartment or can utilize the content information in the passenger compartment. The shop can recommend the user to utilize the content information in the passenger compartment before and after purchasing a merchandise item of the shop. Thus, the shop can use the passenger compartment of the vehicle as a shop space.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

The following describes embodiments of the present disclosure with reference to figures in detail. It should be noted that the same or corresponding portions are given the same reference characters and are not described repeatedly.

<System Configuration>

Figure 1:
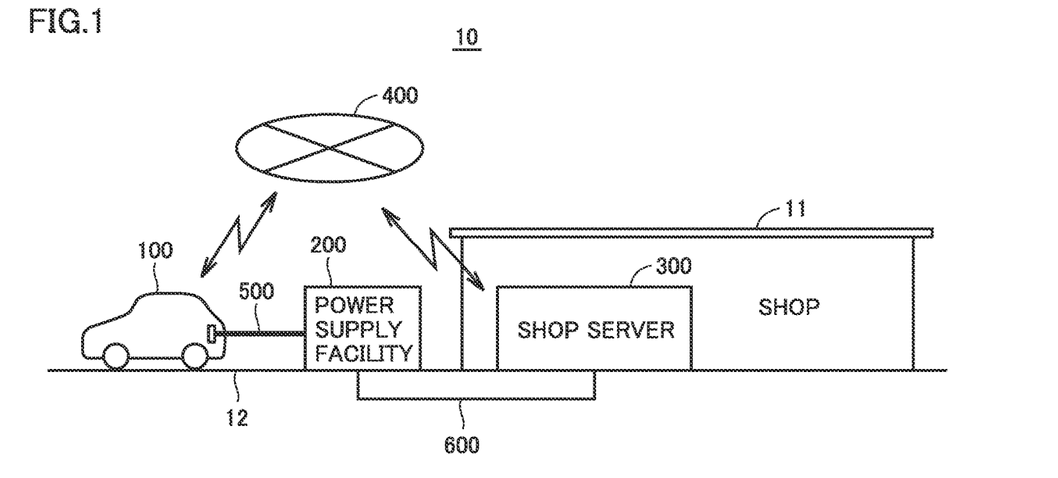
FIG. 1 schematically shows an entire configuration of an information providing system.

FIG. 1 schematically shows an entire configuration of an information providing system 10 according to the present embodiment. Information providing system 10 includes an electrically powered vehicle (hereinafter, also simply referred to as "vehicle") 100, a power supply facility 200 and a shop server 300. It should be noted that vehicle 100 and shop server 300 are configured to wirelessly communicate with each other via a communication network 400 such as the Internet or a telephone network.

As described below with reference to FIG. 2, vehicle 100 is an electric vehicle (EV) configured to generate driving power for traveling using electric power from a power storage device mounted thereon and to permit charging of the power storage device using electric power supplied from a power supply external to the vehicle.

Power supply facility 200 is installed at parking area 12 in the site of a shop 11. Power supply facility 200 includes a power cable 500. In a state that power cable 500 is connected to vehicle 100 parked at parking area 12, power supply facility 200 is configured to: supply power from a commercial power grid to vehicle 100 via power cable 500; and perform wired communication (for example, PLC (Power Line Communication)) with vehicle 100 using power cable 500.

Shop server 300 is provided inside shop 11, and is configured to manage information such as order reception of merchandise items handled by shop 11, financial results, and the like. It should be noted that shop server 300 may be provided outside shop 11. Shop server 300 is connected to power supply facility 200 via a communication line 600, and can exchange information with power supply facility 200 via communication line 600.

Figure 2:
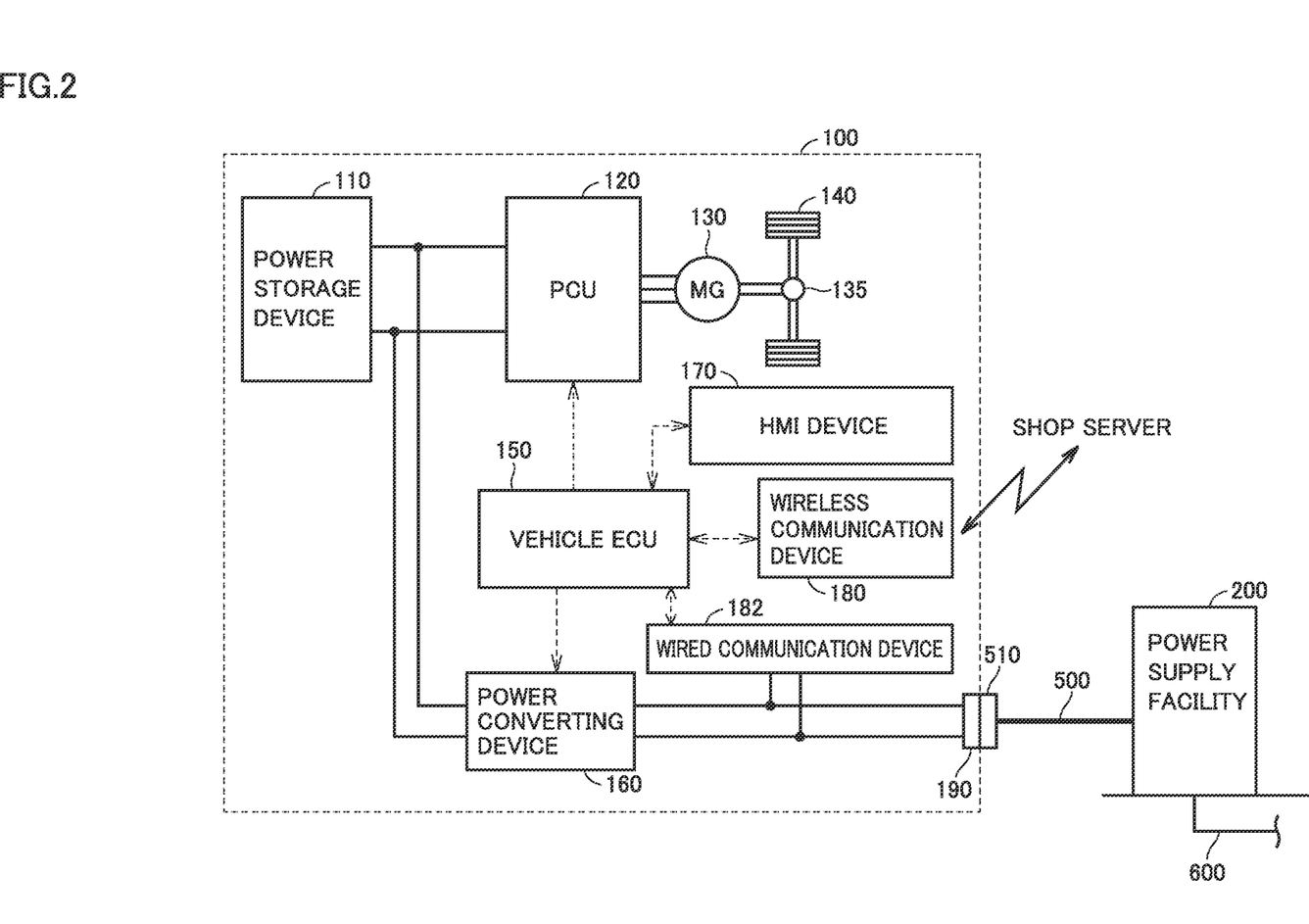
FIG. 2 shows an exemplary configuration of a vehicle.

FIG. 2 shows an exemplary configuration of vehicle 100. Vehicle 100 includes a power storage device 110, a PCU 120 serving as a driving device, a motor generator 130, a power transmitting gear 135, driving wheels 140, a vehicle ECU (Electronic Control Unit) 150, and a HMI (Human Machine Interface) device 170.

Power storage device 110 is configured to be charged and discharged. Power storage device 110 is configured to include a secondary battery such as a lithium ion battery or a nickel-hydrogen battery, or include a power storage element such as an electric double layer capacitor, for example. Power storage device 110 supplies electric power to PCU 120 so as to generate driving power of vehicle 100. Further, power storage device 110 stores electric power generated by motor generator 130.

PCU 120 is controlled by a control signal from vehicle ECU 150 and converts DC power received from power storage device 110 into AC power for driving motor generator 130.

Motor generator 130 is an alternating-current rotating electrical machine, such as a permanent-magnet type synchronous motor including a rotor having a permanent magnet embedded therein. Output torque of motor generator 130 is transmitted to driving wheels 140 via power transmitting gear 135 to travel vehicle 100. Motor generator 130 is capable of generating electric power using rotation power of driving wheels 140 when vehicle 100 operates for regenerative braking. The electric power thus generated is converted by PCU 120 into charging power for power storage device 110.

Although not shown in FIG. 2, vehicle ECU 150 includes a CPU (Central Processing Unit), a storage device, and an input/output buffer, so as to receive signals from sensors, send control signals to devices, and control vehicle 100 and the devices. It should be noted that they can be controlled by not only a process performed by software but also a process performed by dedicated hardware (electronic circuit) constructed therefor.

As a configuration for charging power storage device 110 using power supplied from power supply facility 200, vehicle 100 further includes a power converting device 160 and an inlet 190. A charging connector 510 of power cable 500 is connected to inlet 190. Then, power from power supply facility 200 is supplied to vehicle 100 via power cable 500.

Power converting device 160 is connected between power storage device 110 and inlet 190. Power converting device 160 is controlled by a control signal from vehicle ECU 150 to convert power supplied from power supply facility 200 into power with which power storage device 110 can be charged.

HMI device 170 is a device configured to: provide video information or audio information from vehicle ECU 150 to the user by reproducing them; and receive an operation of the user. HMI device 170 is configured to include a display, a speaker, a touch panel, an input switch, and the like.

As a configuration for communicating with external devices, vehicle 100 includes a wireless communication device 180 and a wired communication device 182.

Wireless communication device 180 is an interface for performing wireless communication, via communication network 400, between vehicle ECU 150 and an terminal (shop server 300 or the like) external to the vehicle.

Wired communication device 182 is an interface for performing wired communication between vehicle ECU 150 and power supply facility 200 using power cable 500. It should be noted that FIG. 2 shows a configuration for performing so-called power line communication (PLC) as the wired communication using power cable 500. It should be noted that the wired communication using power cable 500 is not limited to the power line communication (PLC), and may be wired communication using a communication line that is provided in power cable 500 and that is different from the power line.

Figure 3:
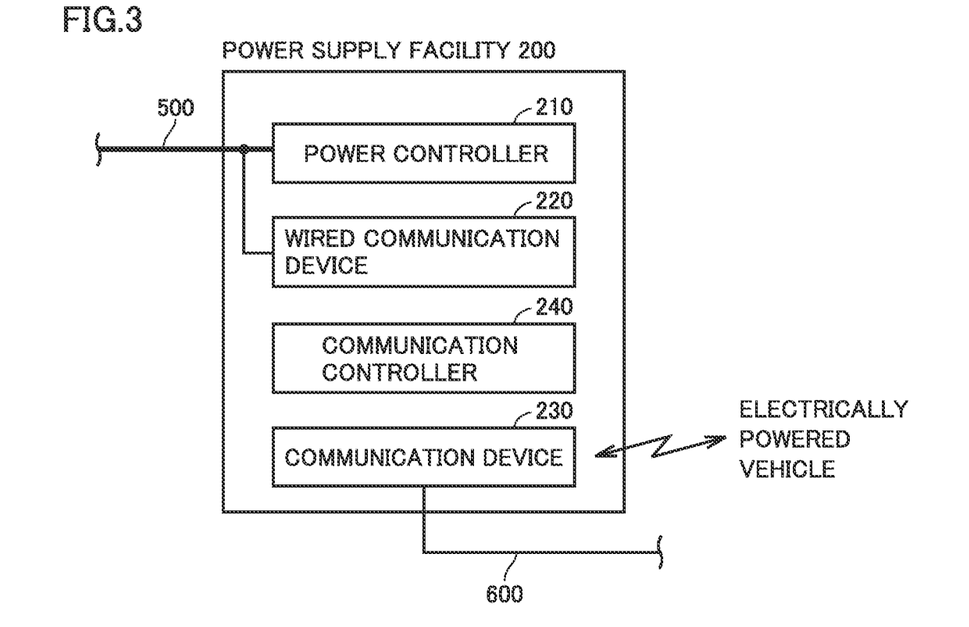
FIG. 3 is a block diagram showing an exemplary configuration of a power supply facility.

FIG. 3 is a block diagram showing an exemplary configuration of power supply facility 200. Power supply facility 200 includes a power controller 210, a wired communication device 220, a communication device 230, and a communication controller 240.

Based on information from communication controller 240 or the like, power controller 210 controls power supplied from a commercial power grid to vehicle 100 via power cable 500.

Wired communication device 220 is an interface for performing wired communication with vehicle 100 using power cable 500. Communication device 230 is an interface for performing wireless communication with vehicle 100 via communication network 400 and for performing wired communication with shop server 300 via communication line 600.

Communication controller 240 is configured to: transmit, to power controller 210, information received by wired communication device 220 or communication device 230; and transmit, to wired communication device 220 or communication device 230, information from power controller 210.

Moreover, communication controller 240 performs a relay process for: transmitting, from communication device 230 to shop server 300, information received from vehicle 100 by wired communication device 220; and transmitting, from wired communication device 220 to vehicle 100, information received from shop server 300 by communication device 230.

Figure 4:
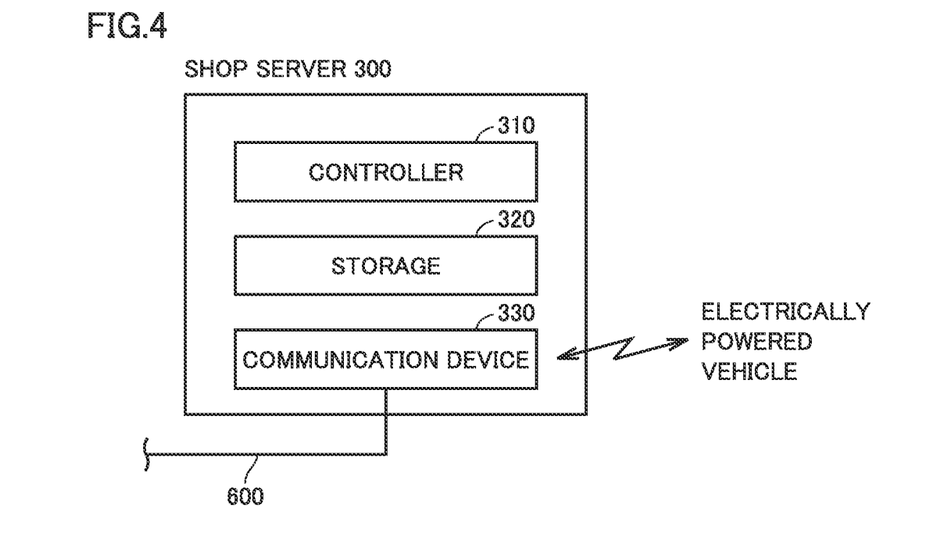
FIG. 4 is a block diagram showing an exemplary configuration of a shop server.

FIG. 4 is a block diagram showing an exemplary configuration of shop server 300. Shop server 300 includes a controller 310, a storage 320, and a communication device 330.

Communication device 330 is an interface for performing wireless communication with vehicle 100 via communication network 400, and for performing wired communication with power supply facility 200 via communication line 600.

Various pieces of information about merchandise items handled by shop 11 are stored in storage 320. The information stored in storage 320 includes vehicle-utilized information that can be utilized in the passenger compartment of vehicle 100 connected to power supply facility 200 via power cable 500. This vehicle-utilized information includes: merchandise item information of merchandise items that can be offered to customers by shop 11; and content information (movie, video, still image, music, speech, newspaper, magazine, electronic book, game, comics, and the like) that can be utilized by the user of vehicle 100 in the passenger compartment of vehicle 100. The merchandise item information and content information stored in storage 320 are updated regularly.

Controller 310 is configured to perform a process for managing information such as order reception of merchandise items handled by shop 11 and financial results.

Moreover, when vehicle 100 is connected to power supply facility 200 via power cable 500, controller 310 is configured to perform a process (hereinafter, also referred to as "information providing process") for transmitting the vehicle-utilized information stored in storage 320, from power supply facility 200 to vehicle 100 via power cable 500.

<Information Providing Process>

Figure 5:
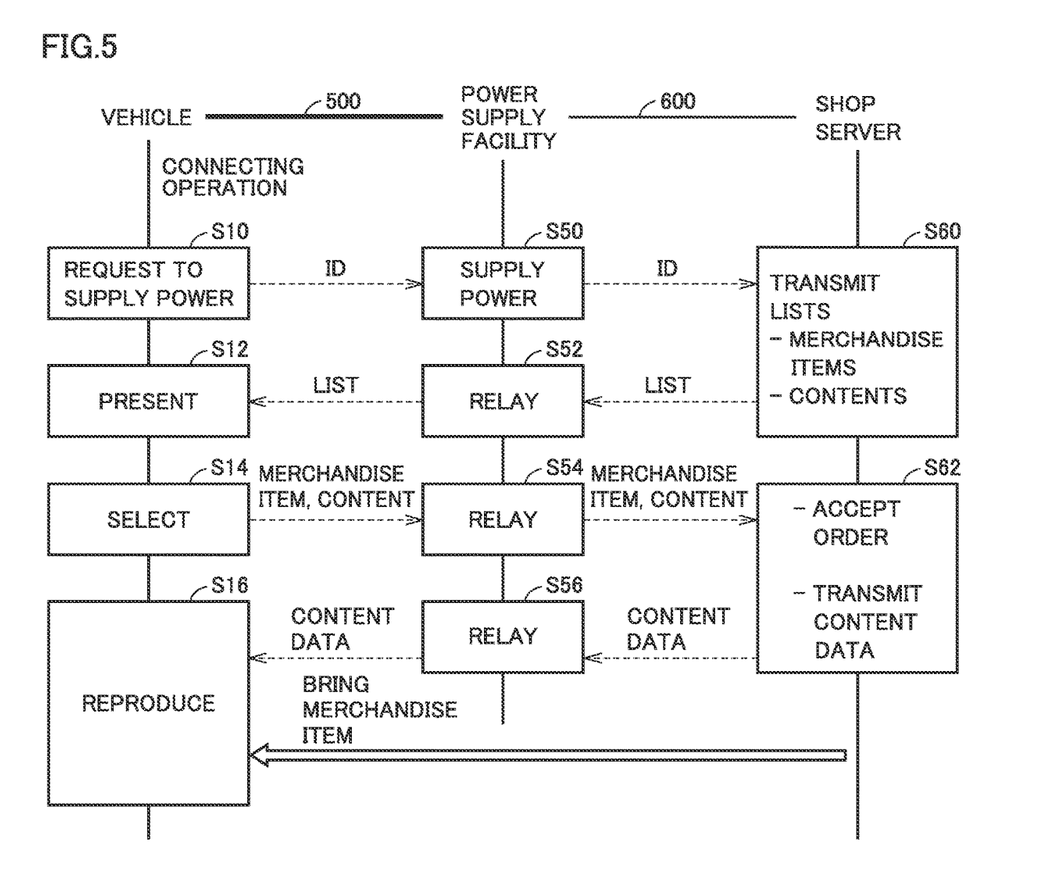
FIG. 5 shows an exemplary information providing process performed among the vehicle, the power supply facility, and the shop server, which are included in the information providing system.

FIG. 5 shows an exemplary information providing process performed among vehicle 100 (more specifically, vehicle ECU 150), power supply facility 200 (more specifically, power controller 210 or communication controller 240), and shop server 300 (more specifically, controller 310), which are included in information providing system 10. The process shown in FIG. 5 is triggered to be started by the user of vehicle 100 parking vehicle 100 at parking area 12 of shop 11 and performing an operation of connecting power cable 500 of power supply facility 200 to inlet 190 of vehicle 100.

It should be noted that in FIG. 5, the wired communication using power cable 500 is employed for the communication between vehicle 100 and power supply facility 200, and the wired communication using communication line 600 is employed for the communication between power supply facility 200 and shop server 300.

Vehicle 100 transmits a power-receiving request including vehicle ID (information for specifying vehicle 100) to power supply facility 200 (step S10).

When power supply facility 200 receives the power-receiving request from vehicle 100, power supply facility 200 supplies power to vehicle 100 and transmits the vehicle ID to shop server 300 (step S50).

When shop server 300 receives the vehicle ID from power supply facility 200, shop server 300 transmits, to power supply facility 200, a list of the pieces of vehicle-utilized information (merchandise item information and content information) stored in storage 320 (step S60). This list includes: a "merchandise item list" including types and names of merchandise items that can be offered by shop 11; and a "content list" including types and names of contents that can be offered to vehicle 100 by shop 11.

Power supply facility 200 performs a relay process for transmitting, to vehicle 100 via power cable 500, the merchandise item list and content list received from shop server 300 (step S52).

Vehicle 100 presents, on HMI device 170, the merchandise item list and content list received from power supply facility 200 (step S14).

When the user of vehicle 100 selects a merchandise item and a content from the merchandise item list and content list presented on HMI device 170, vehicle 100 transmits, to power supply facility 200, information of the merchandise item (hereinafter, also referred to as "selected merchandise item") selected by the user and the content (hereinafter, also referred to as "selected content") selected by the user (step S14).

Power supply facility 200 performs a relay process for transmitting, to shop server 300, the selected merchandise item and selected content received from vehicle 100 (step S54).

When shop server 300 receives the selected merchandise item and selected content from power supply facility 200, shop server 300 accepts the order of the selected merchandise item, instructs a salesclerk of shop 11 to bring the selected merchandise item to vehicle 100, reads the data of the selected content from storage 320, and transmits it to power supply facility 200 (step S62). It should be noted that the data of the selected content is data by which the selected content can be reproduced by HMI device 170 located in the passenger compartment of vehicle 100. For example, when the selected content is a movie, the data of the selected content is data by which the movie can be viewed using HMI device 170.

Power supply facility 200 performs a relay process for transmitting, to vehicle 100 via power cable 500, the data of the selected content received from shop server 300 (step S56).

When vehicle 100 receives the data of the selected content from power supply facility 200, vehicle 100 controls HMI device 170 in the passenger compartment of vehicle 100 to reproduce the data of the received selected content (step S16).

It should be noted that the selected merchandise item ordered and accepted in step S62 is then brought to vehicle 100 by the salesclerk of shop 11.

As described above, when vehicle 100 is connected to power supply facility 200 via power cable 500, power supply facility 200 according to the present embodiment transmits, to vehicle 100 through the wired communication using power cable 500, the merchandise item list and content list that can be offered by shop 11 and the content data that can be reproduced in the passenger compartment of vehicle 100.

Accordingly, while charging power storage device 110 of vehicle 100 using power supply facility 200, the user of vehicle 100 can check the merchandise item list of shop 11 in the passenger compartment or can utilize (reproduce) the content data in the passenger compartment. Meanwhile, shop 11 can recommend the user of vehicle 100 to utilize the content data in the passenger compartment before and after purchasing a merchandise item of shop 11. Thus, shop 11 can use the passenger compartment of vehicle 100 as a shop space.

Further, power supply facility 200 according to the present embodiment does not store the information to be transmitted to vehicle 100, and receives the information from shop server 300. Therefore, respective pieces of information to be transmitted to vehicle 100 can be collectively stored and managed in shop server 300, rather than power supply facility 200. Accordingly, even when shop 11 owns a plurality of power supply facilities 200, the information to be transmitted to vehicle 100 can be stored and managed readily.

Further, vehicle 100 according to the present embodiment transmits, to shop server 300 via power supply facility 200, the information of the selected merchandise item selected by the user of the vehicle from the merchandise items included in the merchandise item list received from power supply facility 200. When shop server 300 receives the information of the selected merchandise item from vehicle 100, shop server 300 accepts an order of the merchandise item to shop 11. Accordingly, while charging power storage device 110 of vehicle 100 using power supply facility 200, the user of vehicle 100 not only can check the merchandise item list of shop 11 in the passenger compartment but also can order a merchandise item in the passenger compartment. Then, the selected merchandise item ordered and accepted is delivered to vehicle 100 by the salesclerk of shop 11. Hence, the user of vehicle 100 can order and receive a merchandise item in the passenger compartment without moving into shop 11, whereby the user can leisurely enjoy the content information received from power supply facility 200.

<Modification 1>

In the above-described embodiment, when shop server 300 receives the vehicle ID, shop server 300 transmits the merchandise item list of the merchandise items that can be offered by shop 11 (step S60 of FIG. 5).

This merchandise item list may be customized to suit to preference of the user of vehicle 100. For example, shop server 300 stores respective order histories of users based on vehicles ID. When a vehicle ID is newly received, information of a history of merchandise items ordered by the user of that vehicle ID in the past or information of a history of merchandise items ordered by other users who ordered the same merchandise item as a merchandise item ordered by the user of that vehicle ID in the past may be added to the merchandise item list.

<Modification 2>

In the above-described embodiment, the user of vehicle 100 can order and receive a merchandise item in the passenger compartment without moving into shop 11.

In addition to this, payment of a selected merchandise item may be also made such that the user of vehicle 100 can pay the price for the merchandise item in the passenger compartment when shop server 300 accepts the order of the selected merchandise item in step S62. Accordingly, convenience for the user of vehicle 100 can be improved further.

<Modification 3>

In the above-described embodiment, the merchandise item list and the content list are transmitted from power supply facility 200 to vehicle 100 via the wired communication using power cable 500.

However, since it is considered that amounts of information of the merchandise item list and the content list are much smaller than an amount of information of the content data, these lists may be transmitted through wireless communications using communication network 400 rather than the wired communication.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An information providing system comprising:
   a power supply facility installed at a parking area of a shop; and
   a vehicle connectable to the power supply facility via a power cable, wherein
   when the vehicle is connected to the power supply facility via the power cable, the power supply facility being configured to transmit information to the vehicle via the power cable,
   the information including
      merchandise item information of one or more merchandise items that are able to be offered by the shop to a user of the vehicle, and
      content information that is able to be utilized by the user of the vehicle in a passenger compartment of the vehicle, and
   the information providing system further comprises a server configured to communicate with the power supply facility and store the information, wherein
      the server is configured to add, to the merchandise item information transmitted from the power supply facility to the vehicle, information of a history of merchandise items ordered by the user of the vehicle in the past or information of a history of merchandise items ordered by other users who ordered the same merchandise item as a merchandise item ordered by the user of the vehicle in the past, and
      when the vehicle is connected to the power supply facility via the power cable, the power supply facility is configured to transmit, to the vehicle via the power cable, the information received from the server to a human machine interface device disposed in the passenger compartment of the vehicle for displaying the information to the user of the vehicle.

2. The information providing system according to claim 1, wherein the vehicle is configured to transmit, to the server, information of a merchandise item selected by the user of the vehicle from the merchandise items included in the merchandise item information received from the power supply facility, and when the server receives, from the vehicle, the information of the merchandise item selected by the user of the vehicle, the server is configured to accept an order of the merchandise item to the shop.

3. A server configured to communicate with a power supply facility installed at a parking area of a shop, the server comprising:

a storage configured to store information; and a controller configured to perform, when a vehicle is connected to the power supply facility via a power cable, a process for transmitting the information stored in the storage from the power supply facility to the vehicle via the power cable, the information including merchandise item information of one or more merchandise items that are able to be offered by the shop to a user of the vehicle, and content information that is able to be utilized by the user of the vehicle in a passenger compartment of the vehicle, wherein the server is configured to add, to the merchandise item information transmitted from the power supply facility to the vehicle, information of a history of merchandise items ordered by the user of the vehicle in the past or information of a history of merchandise items ordered by other users who ordered the same merchandise item as a merchandise item ordered by the user of the vehicle in the past, and when the vehicle is connected to the power supply facility via the power cable, the power supply facility is configured to transmit, to the vehicle via the power cable, the information received from the server to a human machine interface device located in the passenger compartment of the vehicle for displaying the information to the user of the vehicle.

* * * * *